(12) United States Patent
LaMontagne et al.

(10) Patent No.: US 11,880,954 B2
(45) Date of Patent: Jan. 23, 2024

(54) METHODS AND SYSTEMS FOR GENERATING DIGITAL SMART OBJECTS FOR USE IN A THREE DIMENSIONAL ENVIRONMENT

(71) Applicant: Trivver, Inc., Merritt Island, FL (US)

(72) Inventors: Joel LaMontagne, Merritt Island, FL (US); Simon Keating, Aldershot (GB)

(73) Assignee: Trivver, Inc., Merritt Island, FL (US)

( * ) Notice: Subject to any disclaimer, the term of this patent is extended or adjusted under 35 U.S.C. 154(b) by 210 days.

(21) Appl. No.: 15/209,679

(22) Filed: Jul. 13, 2016

(65) Prior Publication Data

US 2018/0018828 A1 Jan. 18, 2018

(51) Int. Cl.
*G06T 19/20* (2011.01)
*G06F 3/04815* (2022.01)
(Continued)

(52) U.S. Cl.
CPC .......... *G06T 19/20* (2013.01); *G06F 3/04815* (2013.01); *G06F 3/04845* (2013.01);
(Continued)

(58) Field of Classification Search
CPC ..... G06T 19/20; G06T 15/005; G06T 15/405; G06T 17/20; G06T 2200/24;
(Continued)

(56) References Cited

U.S. PATENT DOCUMENTS

| | | | | |
|---|---|---|---|---|
| 5,894,308 A | * | 4/1999 | Isaacs | G06T 17/20 |
| | | | | 345/420 |
| 6,456,286 B1 | * | 9/2002 | Arai | G06T 15/00 |
| | | | | 345/423 |

(Continued)

FOREIGN PATENT DOCUMENTS

WO WO2006016891 5/2013

OTHER PUBLICATIONS

Merriam-Webster Dictionary, available at https://www.merriam-webster.com/dictionary/placeholder (last visited Aug. 25, 2023).*

(Continued)

*Primary Examiner* — Alexandru Cirnu
(74) *Attorney, Agent, or Firm* — Chhabra Law Firm, PC

(57) ABSTRACT

Using various embodiments, methods and systems for generating three-dimensional (3D) digital smart objects for use in various 3D environments to collect data related to user interaction or viewability with the 3D digital smart object are described. In one embodiment, a system can generate a 3D digital smart object by presenting a 3D placeholder to a publisher or developer of the 3D environment, receive an asset, receive asset data including asset category and asset type associated to the asset and a minimum and maximum asset polygon count value. The system can also receive standard asset size information of the asset including an X-axis, Y-axis, and Z-axis dimension of the asset, and receive an asset positioning information, including an anchor location and an asset orientation of the asset. The data received can then be stored to generate the 3D digital smart object that can be placed within a 3D environment.

27 Claims, 10 Drawing Sheets

(51) Int. Cl.
| | |
|---|---|
| G06Q 30/0241 | (2023.01) |
| G06F 3/04845 | (2022.01) |
| G06T 15/00 | (2011.01) |
| G06T 15/40 | (2011.01) |
| G06T 17/20 | (2006.01) |

(52) U.S. Cl.
CPC ....... *G06Q 30/0277* (2013.01); *G06T 15/005* (2013.01); *G06T 15/405* (2013.01); *G06T 17/20* (2013.01); *G06T 2200/24* (2013.01); *G06T 2219/2016* (2013.01); *G06T 2219/2024* (2013.01)

(58) Field of Classification Search
CPC ..... G06T 2219/2016; G06T 2219/2024; G06F 3/04815; G06F 3/04845; G06Q 30/0277
See application file for complete search history.

(56) References Cited

U.S. PATENT DOCUMENTS

| | | | |
|---|---|---|---|
| 6,828,966 B1 | 12/2004 | Gavriliu et al. | |
| 9,443,352 B1 | 9/2016 | Glover et al. | |
| 2002/0033845 A1* | 3/2002 | Elber | G06T 17/00 |
| | | | 715/764 |
| 2002/0122033 A1* | 9/2002 | Rupieper | G01B 11/24 |
| | | | 345/419 |
| 2004/0125103 A1 | 7/2004 | Kaufman et al. | |
| 2005/0081161 A1* | 4/2005 | MacInnes | G06F 17/5004 |
| | | | 715/765 |
| 2006/0105841 A1* | 5/2006 | Rom | A63F 13/12 |
| | | | 463/42 |
| 2006/0287105 A1 | 12/2006 | Willis | |
| 2007/0060345 A1 | 3/2007 | Edwards | |
| 2007/0060346 A1 | 3/2007 | Edwards | |
| 2007/0070066 A1 | 3/2007 | Bakhash | |
| 2007/0072676 A1 | 3/2007 | Baluja | |
| 2007/0078706 A1 | 4/2007 | Datta et al. | |
| 2008/0021882 A1* | 1/2008 | Pu | G06F 17/30247 |
| 2009/0138813 A1 | 5/2009 | LaMontagne | |
| 2010/0030640 A1 | 2/2010 | van Datta et al. | |
| 2010/0217666 A1* | 8/2010 | Belenguer | G06F 17/30905 |
| | | | 705/14.45 |
| 2011/0302535 A1 | 12/2011 | Clerc et al. | |
| 2013/0124311 A1 | 5/2013 | Sivanandan et al. | |
| 2013/0158965 A1 | 6/2013 | Beckman | |
| 2013/0262233 A1* | 10/2013 | Bradley | G06Q 30/0267 |
| | | | 705/14.64 |
| 2014/0114742 A1 | 4/2014 | Lamontagne et al. | |
| 2014/0149903 A1 | 5/2014 | Ahn et al. | |
| 2015/0035822 A1 | 2/2015 | Arsan et al. | |
| 2015/0035823 A1 | 2/2015 | Arsan et al. | |
| 2016/0293133 A1 | 10/2016 | Dutt | |
| 2017/0132567 A1 | 5/2017 | Glunz | |
| 2017/0228943 A1 | 8/2017 | Arsan et al. | |

OTHER PUBLICATIONS

"Methods for Automated Object Placement in Virtual Scenes" UKSim 2009: 11th International Conference on Computer Modelling and Simulation R.J. Cant and C.S .Langensiepen (Year: 2009).*

Vire AR/VR tracking [available at http://vire.co/tracking], publication date unknown.

Akihiro Eguchi "Smart Objects in a Virtual World", Inquiry: The University of Arkansas Undergraduate Research Journal, Jan. 1, 2010 (Jan. 1, 2010), pp. 1-7, XP55651377, Retrieved from the Internet: URL:https://pdfs.semanticscholar.org/244fl4163487deebc23200c4d2852654ad9c5b9a9.pdf [retrieved on Dec. 10, 2019].

Unity Technologies: "Unity—Manual: GameObject". Unity Manual version 5.3. Apr. 5, 2016 (Apr. 5, 2016). XP55651354. Retrieved from the Internet: URL:https://web.archive.org/web/20160405025908/http://docs.unity3d.com:80/530/Documentation/Manual/class-GameObject.html [retrieved on Dec. 10, 2019].

Unity Technologies: "Unity—Manual: 1-12 Primitive and Placeholder Objects".Unity Manual version 5.3. May 26, 2016 (May 26, 2016). XP55651357. Retrieved from the Internet:URL:https://web.archive.org/web/20160526135926/http://docs.unity3d.com/530/Documentation/Manual/rimitiveObjects.html [retrieved on Dec. 10, 2019] * p. 1. line 1-last line *.

* cited by examiner

METHODS AND SYSTEMS FOR GENERATING DIGITAL SMART OBJECTS FOR USE IN A THREE DIMENSIONAL ENVIRONMENT

FIELD OF THE INVENTION

Embodiments of the present invention generally relates to the field of three dimensional environments. More particularly, embodiments of the invention relate to the generation of three dimensional digital assets that can be used for data collection purposes, in a three dimensional environment, for advertisers, data analysts, developers, or educationalists/trainers in a variety of fields.

BACKGROUND OF THE INVENTION

Digital advertising currently requires creating specific and customized content (e.g., images, videos, text, etc.) for each advertiser individually, and placing them directly at various forms of digital platforms (e.g., websites, games, etc.). Furthermore, such advertising often relies on Hypertext Transfer Protocol (HTTP) based cookies. An HTTP cookie, also known as a web cookie or browser cookie, is data sent from a server and stored at a client's machine comprising information related to the user's choices so that only relevant ads are transmitted to the user. Conventionally, once the user visits a website/web-page, a third party cookie is saved locally at the client machine, and each time the client revisits the webpage/website the cookie is transmitted back to the third party server. Furthermore, such systems require that the advertiser provide content for the advertisement, however, the advertiser has no control over where or how the content would be displayed, except for providing keywords to the advertising system.

However, such advertising systems often result in ineffective advertising due to the inherent limitations of keyword-based advertising. Furthermore, fake or mistaken clicks occur regularly, which are further detrimental to the advertiser's interest. Such systems have no means of determining, in advance, if its advertising at a publisher's digital platform would generate in meaningful results. Thus, conventional advertising platforms often result in wasteful and inefficient advertising.

Therefore, efficient systems, methods, and techniques are needed that allow a developer, publisher, or advertiser to overcome these limitations without the use of cookies. Such systems should further permit the developer or publisher to provide information that can help an advertiser determine the intended audience of the publisher's content.

SUMMARY OF THE DESCRIPTION

Using various embodiments, methods, and systems are disclosed to generate three dimensional (3D) digital assets, referred to as smart objects or digital smart objects herein, for use in various digital platforms. 3D digital smart objects, in one embodiment, can be used to generate generic content (banner/billboard, videos, and/or 3D assets) that can optionally be replaced with branded content from an advertiser within a variety of digital platforms and measure the user performance with both the generic and branded content across the digital platform. In one embodiment, a 3D digital smart object comprises an asset encompassed in a transparent 3D asset placeholder that dictates the maximum X-Axis, Y-Axis, and Z-Axis dimensions of an asset/object and/or and understands the scaling dimensions that take up a specific shape in a 3D digital environment. The asset within the 3D asset placeholder provides a visual representation of the 3D digital smart object. The asset can be, in one embodiment, a 3D representation of geometric data, where the asset within the 3D asset placeholder provides a visual representation of the 3D digital smart object. A 3D digital smart object comprises an asset that can be any media content such as a 3D non-active asset, video, audio, multi-media object, any general 3D representation of geometric data, or a combination thereof. In various embodiments, 3D digital smart objects can be used for services related to advertising, notification, or generally for any service that can personalize a viewer's environment with 3D content that is relevant to each viewer.

In one embodiment a digital smart object generation system can be configured to present a 3D placeholder to a publisher/game developer of a 3D environment and receive an asset from the publisher to be placed within the 3D placeholder. Throughout this disclosure developer and publisher refer to the digital platform creator, and have been used interchangeably. The developer can further select an asset category and/or asset type related to the asset, using which data related to the 3D digital smart object would be cataloged in a repository or database. In one embodiment, the asset category and asset type can assist the system and/or an advertiser using the system in determining the relevancy of the 3D digital smart object to a viewer. Once the asset is uploaded, the system can then associate the developer or publisher's selected asset category and/or asset type with the uploaded asset. The digital smart object generation system can also receive standard asset size information of the asset within the 3D asset placeholder; the standard asset size information includes an X-axis, Y-axis, and Z-axis dimension of the asset within the 3D asset placeholder. The standard asset size information provides the maximum 3D size of the asset that can be accommodated within the 3D asset placeholder without disturbing the aspect ratio of the asset, as determined suitable by the developer or publisher. In one embodiment, the 3D placeholder can be a cube. However, the 3D placeholder is not limited to any particular geometrical shape. For example, in various embodiments, the 3D placeholder can be a polyhedron, cylinder, sphere, cone, torus based structure, or a combination thereof. Further, the standard asset size information, in one embodiment, can be determined when the X-axis, Y-axis, or Z-axis dimension of the asset equals its corresponding axis dimension of the 3D asset placeholder. This can be achieved when the developer places a 3D asset in the 3D asset placeholder and scales the asset so that at least one of the dimensions of the asset equals that of the 3D placeholder. In one embodiment, such scaling of the asset can be achieved when the developer clicks and drags the asset to maximize the asset size within the 3D asset placeholder.

A system using the techniques described herein can also be configured to receive (or provide) the asset a positioning information including asset orientation information and asset position anchor location. The asset position anchor location determines the location of the asset relative to the 3D asset placeholder, while the asset orientation determines the orientation of the asset itself (e.g., vertical, horizontal, etc.); the asset position anchor location in one embodiment can be the X-axis coordinates, the Y-axis coordinates, the Z-axis coordinates, or a combination thereof, of the 3D asset placeholder. The asset position anchor location is the axis of the 3D asset placeholder that acts as a base axis for the asset (in other words, the asset's orientation is relative to the selected axis of the 3D placeholder). In such an embodiment, the anchor location can be provided by the developer or can be defaulted to a certain axis (e.g., X-axis). An X-axis coordinates based anchor position (e.g, in a 1×1×1 cube, a (0.5,0,0) based anchor position would indicate that the anchor is positioned on in the middle of the X-axis of the placeholder, with the X-axis as a base position). A Y-axis based anchor position would indicate that the anchor is positioned on the Y-axis of the placeholder (e.g., in a 1×1×1 cube, a (0,0.5,0) based anchor position would indicate that the anchor is positioned in the middle of the Y-axis of the placeholder, with the Y-axis as a base position). A Z-axis based anchor position would indicate the depth of the anchor position within the placeholder (e.g., in a 1×1×1 cube, a (0,0,0.5) based anchor position would indicate that the anchor is positioned on the middle of the Z-axis of the placeholder, with the Z-axis as a base position). Therefore, a combination of X-axis and Y-axis coordinates (e.g., 0.5, 0.5, 0.5) would indicate that the placeholder's anchor position location is hanging in the center of the 3D placeholder. In one embodiment, an anchor position location can assist the developer implementing the digital smart object the creator's intention how the object should be placed within the 3D environment. In another embodiment, the anchor position location can also govern the orientation of the asset when a user/viewer interacts with the digital smart object.

In one embodiment, after the above mentioned information is received by the system, the system can further be configured to store the digital smart object data, including the asset, standard asset size information, asset positioning anchor location, a maximum and minimum polygon count value associated with the asset (when available), and asset data (category and/or type) in a repository. Using the digital smart object data, the system can then further be configured to generate the 3D digital smart object that can be placed within various 3D environments (e.g., games, Virtual Reality environments, Augmented Reality environments, Smartphone Applications ("Apps"), Digital TV (OTT), Web Interfaces, Game Consoles, Video, etc.), and can be associated with advertisements that are to be analyzed. The 3D digital smart object can also record different types of interaction of the 3D digital smart object with a user of the game and transmit user interaction information to the computing device with the use of event triggers (by associating the digital smart object data with the event triggers during generation of the 3D digital smart object). In one embodiment, event triggers are capable of determining user interaction with, or viewability of, a 3D digital smart object and transmit metrics, based on the user interaction (or viewability), to a digital smart object processing system. In one embodiment, the event triggers transmit user interaction including (but not limited to) determining a user viewing a 3D digital smart object, the user interacting with a 3D digital smart object, a distance between the user and a 3D digital smart object, a percentage size of a 3D digital smart object in relationship to the size of the user interface, a time/period that the user interacted with a 3D digital smart object, the percentage of the 3D digital smart object that was viewable on the user's screen (e.g., is the viewable surface of 3D digital smart object 50% below the screen), etc. In one embodiment, event triggers can be configured or customized by the publisher or the advertiser.

In another embodiment, the 3D placeholder can be presented to the developer via an Application Program Interface (API) or a software development kit (SDK). In one embodiment, the asset uploaded for a 3D digital smart object by the publisher can be a generic 3D representation of geometric data. Such a 3D digital smart object is referred to as a Generic Digital smart object (GSO) herein. In another embodiment, an advertiser can replace the generic 3D asset with a branded 3D asset/object associated with the advertiser in a GSO. In such an embodiment, the publisher of the GSO can define a minimum and/or maximum polygon count value for the asset that is allowed within the GSO. An advertiser who wishes to have a generic 3D asset in a GSO to be replaced with a branded object would have to provide the branded object that is within the minimum and maximum polygon count value defined by the publisher. Such a 3D digital smart object (with a branded object/asset) is referred to as a Branded Digital smart object (BSO) herein. In one embodiment, defining a minimum and/or maximum polygon count value assists in generating an advertisement standard that can allow a GSO to be converted into a BSO programmatically. In another embodiment, the publisher can further identify the types of different branded objects that can replace the asset by identifying the asset category and/or asset type, as discussed herein. In one embodiment, the digital smart object data can be further associated with publisher identification data associated with the developer. In another embodiment, the digital smart object data can also be associated with advertiser identification data associated with an advertiser.

BRIEF DESCRIPTION OF THE DRAWINGS

The present invention is illustrated by way of example and not limitation in the figures of the accompanying drawings in which like references indicate similar elements.

DETAILED DESCRIPTION

Various embodiments and aspects of the inventions will be described with reference to details discussed below, and the accompanying drawings will illustrate the various embodiments. The following description and drawings are illustrative of the invention and are not to be construed as limiting the invention. Numerous specific details are described to provide a thorough understanding of various embodiments of the present invention. However, in certain instances, well-known or conventional details are not described in order to provide a concise discussion of embodiments of the present inventions.

Reference in the specification to "one embodiment" or "an embodiment" or "another embodiment" means that a particular feature, structure, or characteristic described in conjunction with the embodiment can be included in at least one embodiment of the invention. The appearances of the phrase "in one embodiment" in various places in the specification do not necessarily all refer to the same embodiment. The processes depicted in the figures that follow are performed by processing logic that comprises hardware (e.g., circuitry, dedicated logic, etc.), software, or a combination of both. Although the processes are described below in terms of some sequential operations, it should be appreciated that some of the operations described can be performed in a different order. Moreover, some operations can be performed in parallel rather than sequentially.

Figure 1:
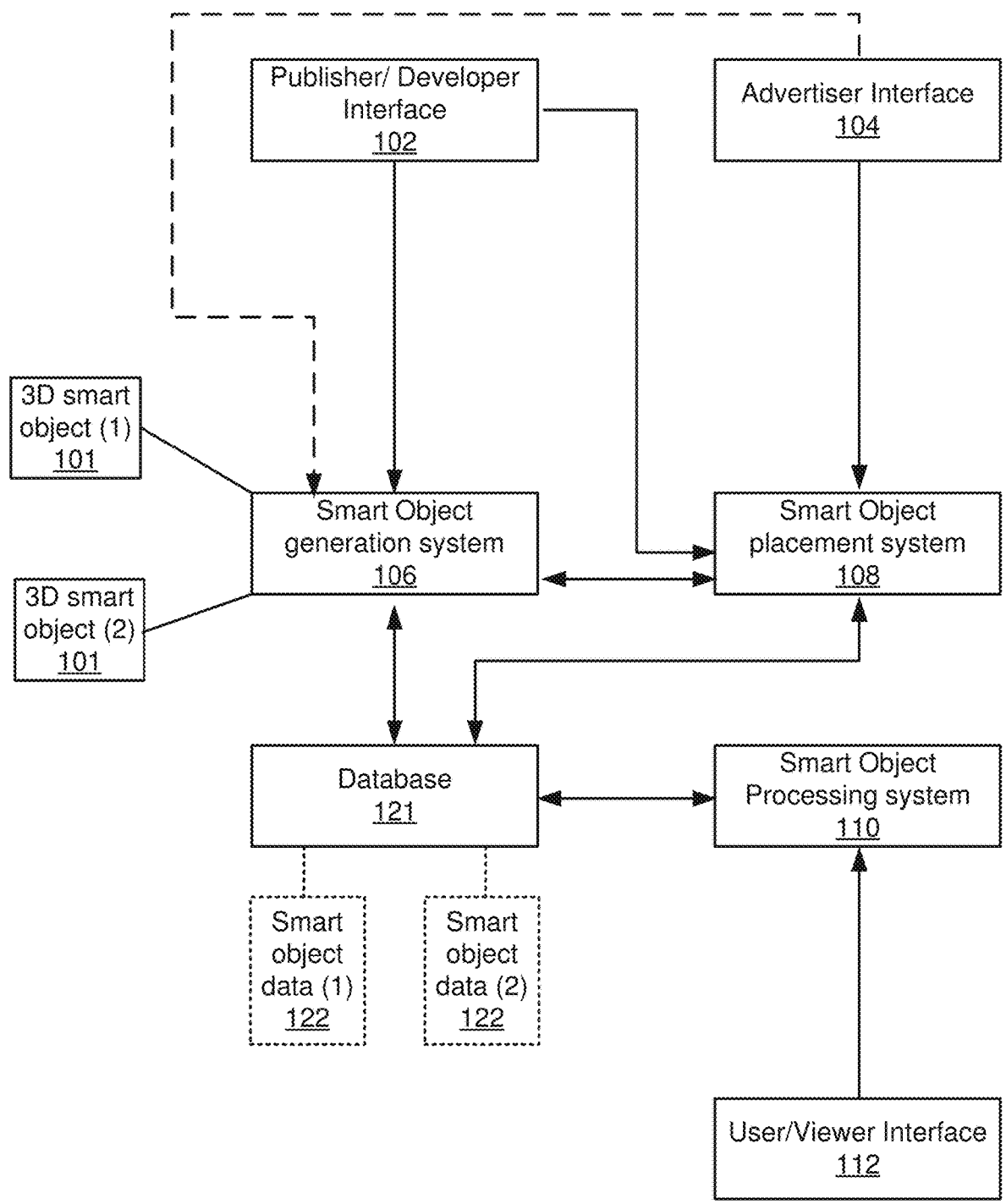
FIG. 1 illustrates a block diagram of a general system architecture that can generate and implement 3D digital smart objects to process advertising related relevant information, according to one embodiment of the present invention.

FIG. 1 illustrates a block diagram of a general system architecture that can generate and implement 3D digital smart objects to process advertising related relevant information, according to one embodiment of the present invention. As illustrated, a publisher or developer can, using publisher interface 102, request the digital smart object generation system 106 to create 3D digital smart object 101, as described further herein. The digital smart object generation system 106 can request the publisher's input to provide digital smart object data 122 and save it in database 121. Digital smart object generation system 106 can interact with the developer using various 3D environments (e.g., games, Virtual Reality environments, Augmented Reality environments, Smartphone Applications ("Apps"), Digital TV (OTT), Web Interfaces, Game Consoles, Videos, etc.). Generally, a 3D environment intending to implement the techniques described herein would need to provide SDK(s), API(s), or any other means using which digital smart object generation system can interact with the 3D environment's development interface. Thus, in one embodiment, publisher interface 102 can be a game development environment (e.g., Unity® engine, Unreal® engine, Adobe® Air, etc.). In another embodiment, publisher interface 102 can be any 3D development environment, as known to a person having ordinary skill in the art. However, it should be noted, the invention described herein is not intended to be limited to any particular 3D development environment.

After 3D digital smart object 101 has been generated, the publisher can request the 3D digital smart object 101 be placed in a 3D environment by requesting the digital smart object placement system 108, using an SDK or API set provided to the developer by the 3D environment. In another embodiment, a system administrator of the digital smart object generation system 106 can generate predetermined digital smart objects that can be directly placed by the developer using digital smart object placement system 108. Generally, digital smart object placement system 108 can be any computing engine that can interact with a 3D environment and determine the location (within the environment) where the 3D digital smart object has been placed by the developer/publisher, and save it as placement data. Digital smart object placement system 108 can further associate the placement data of 3D digital smart object 101 in a 3D environment with 3D environment identification data that identifies the digital platform using 3D digital smart object 101. In one embodiment, 3D digital smart object can be a GSO. After 3D digital smart object 101 is placed in the 3D environment, an advertiser, in one embodiment, using advertiser interface 104 can interact directly with digital smart object generation system 106 (represented with dashed line in FIG. 1) to replace the publisher provided asset with a branded asset to generate a BSO. In another embodiment, advertiser interface 104 can indirectly interact with digital smart object generation system 106 via digital smart object placement system 108. In yet another embodiment, the developer/publisher can provide the system with a branded asset (instead of a generic asset) to generate a BSO.

After the placement of 3D digital smart object 101 into the 3D environment, user interaction or viewability based metrics generated from 3D digital smart object 101 can be generated via digital smart object processing system 110. In one embodiment, digital smart object processing system 110 can be any system that is capable of analyzing information received from 3D digital smart object 101 and generating metrics related to any user interaction, including tapping, touching, moving, viewing (e.g., from a distance), requesting detailed description, etc., of mart object 101, via user interface 112. The generated metrics can be useful to an advertiser and/or publisher associated with the 3D environment.

Various exemplary embodiments of implementing 3D digital smart object 101 in a 3D environment, are disclosed in U.S. patent application Ser. No. 15/209,688 filed concurrently with the instant application, (now U.S. Pat. No. 10,769,859, issued on Sep. 8, 2020), can be employed, in whole or in part, with the present invention. As a result, the above-identified disclosures are incorporated herein by reference in their entirety.

Figure 2:
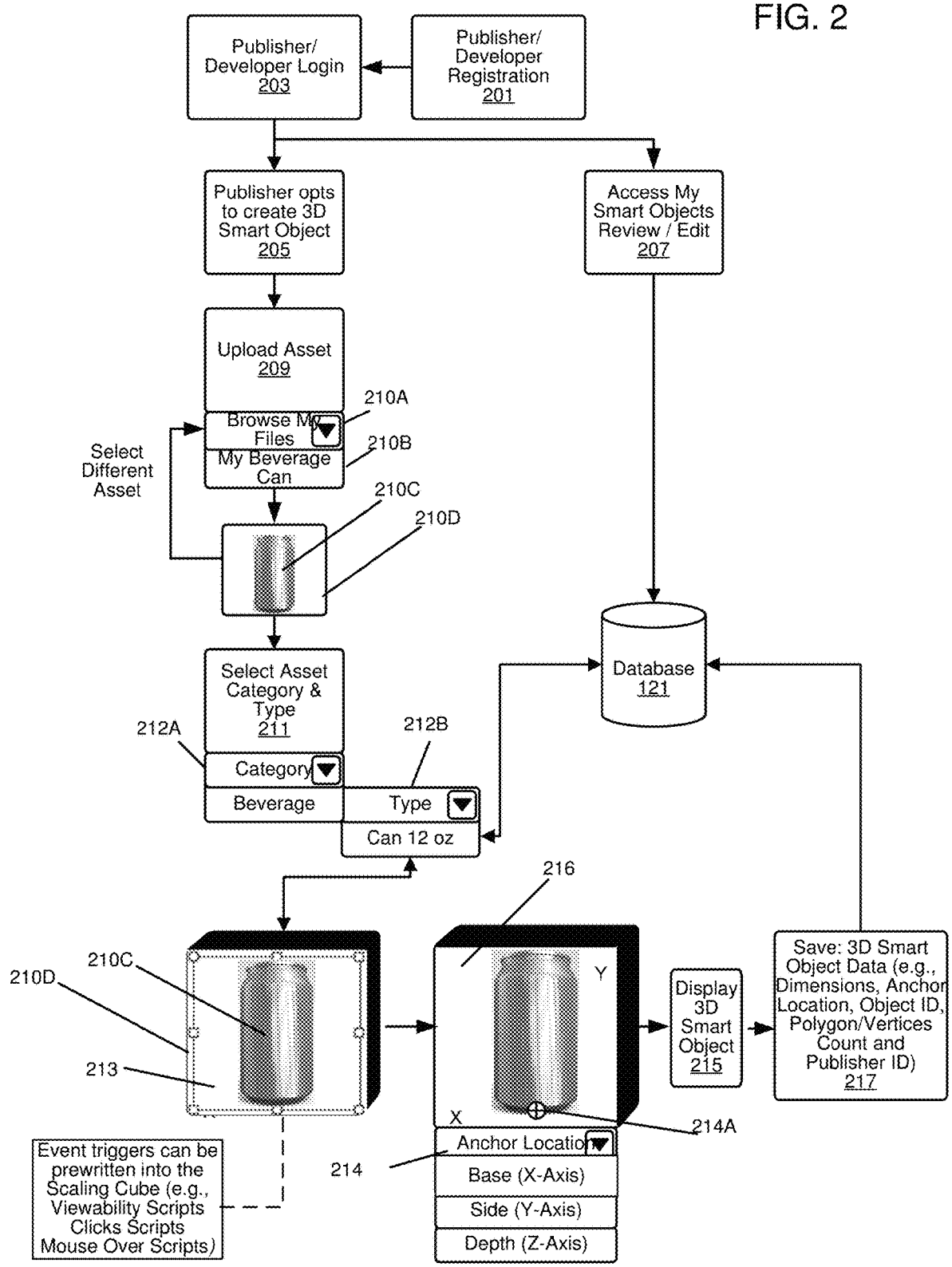
FIG. 2 illustrates a block diagram of generating a 3D digital smart object, according to one embodiment of the present invention.

FIG. 2 illustrates a block diagram of generating a 3D digital smart object by a publisher associated with a 3D environment, according to one embodiment of the present invention. In one embodiment, as illustrated at 201, the publisher registers with the digital smart object generation system. At 203, the publisher logs in to generate 3D digital smart object 101 for use in a 3D environment and a 3D placeholder can be presented to the publisher. At 205, the publisher selects to create 3D digital smart object 101 and a 3D placeholder is presented to the publisher via an API or SDK of the digital smart object generation system 106. At 209, the publisher uploads an asset to use as a 3D geometrical representation of 3D digital smart object 101. The asset in one embodiment, can be a generic 3D representation of geometric data, and the asset within the 3D placeholder provides a visual representation of the 3D digital smart object to be generated. For example, in one embodiment, the user can browse files 210A, and then select an asset 210B (e.g., beverage can), as the intended representation object of 3D digital smart object 101. In one embodiment, once digital smart object generation system 106 receives asset 210C from the publisher, asset 210C is previewed inside a 3D placeholder 210D to the publisher. At 211, the developer is given the opportunity to provide an asset category and/or type that would be associated with the uploaded asset. The asset category and/or type can also be used for cataloging 3D digital smart object 101. For example, in one embodiment, at 212A, the publisher can select asset data, including an asset type category as 'beverage' and at 212B the asset type, in this embodiment, can be a 'beverage can'. In an alternative embodiment, the developer/publisher can also provide a minimum and maximum polygon count of the asset. Such standardization can assist the publisher to ensure only the intended resolution and or size of the asset is used, in case the asset is replaced by a branded asset. This standardization also ensures that a branded asset, if it replaces an asset in a GSO, preserves the quality and load time as intended by the developer/publisher of the GSO. In one embodiment, the developer/publisher can upload a branded asset to directly create a BSO. The selected asset along with asset data (including asset category and asset type related to the asset), and/or minimum/maximum asset polygon count value, as provided by the publisher/developer, is received by digital smart object generation system 106. In one embodiment, the minimum and maximum asset polygon count value is optional, and in certain embodiments, a polygon count value based constraint may not be required at all. The system then associates the asset with an asset identification in database 121.

Thereafter, as illustrated at 213, the publisher is requested to provide a standard asset size information of asset 210C located in 3D placeholder 210D. In one embodiment, the standard asset size information includes an X-axis, Y-axis, and Z-axis dimension of the asset (as intended to represent 3D digital smart object 101). An asset generally provides the visual representation of 3D digital smart object 101. In one embodiment, the standard size information of asset 210C can be provided by the publisher by clicking on asset 210C, and dragging the asset boundary markers to maximize the size of asset 210C within 3D placeholder 210D. This usually means at least one dimension (X-axis, Y-axis, or Z-axis) of asset 210C is equal to the corresponding axis of 3D placeholder 210D. This creates a standard object size for the associated asset category and/or asset type. In one embodiment, 3D Digital smart object 101 encompasses asset 210C in a transparent 3D placeholder cube 210D, where the 3D placeholder cube 210D dictates the maximum XYZ dimensions of an object that takes up a specific space in a 3D environment.

As illustrated at 216, the system requests the publisher to provide asset position information of 3D digital smart object 101, in one embodiment. The asset positioning information includes an anchor positioning location 214 and an asset orientation (not shown). The anchor positioning location, in one embodiment, can be the X-axis coordinates, Y-axis coordinates, Z-axis coordinates, or a combination thereof, of the 3D placeholder; the asset orientation is the desired orientation of the asset selected by the publisher. For example, as illustrated in FIG. 2, asset 210C is illustrated to have a vertical orientation and the asset anchor positioning location 214A is shown to be located on the X-axis. In one embodiment, the anchor positioning location determines how the asset is positioned within 3D environments. Anchor positioning location 214 indicated as the X-axis signifies that the asset is grounded or the determined orientation is relative to the X-axis in the 3D environment. Anchor positioning location 214 indicated as the Y-axis signifies that the asset is grounded or the determined orientation is relative to the Y-axis in the 3D environment. Anchor positioning location 214 indicated as a combination of X-axis coordinate, Y-axis coordinate, and Z-axis coordinate values of the 3D placeholder can signify, in one embodiment that the asset anchor is hanging within the 3D placeholder. Similarly, an orientation position of the asset can be selected with respect to the axis of the 3D placeholder. In yet another embodiment, the asset orientation can be requested from the publisher after providing the standard asset size information at 213. As illustrated at 215, the system displays 3D digital smart object data 101 to the user, and at 217 saves and associates the digital smart object data received from the publisher, including the asset, standard asset size information, asset positioning information, and asset data in repository 121. After 3D digital smart object data is saved, the publisher can edit or review the data, as illustrated at 207. In one embodiment, the 3D digital smart object can now be placed within a 3D environment and associated with data collection activities that measure the user's response, viewability, and/or interaction with the 3D digital smart object.

Figure 3:
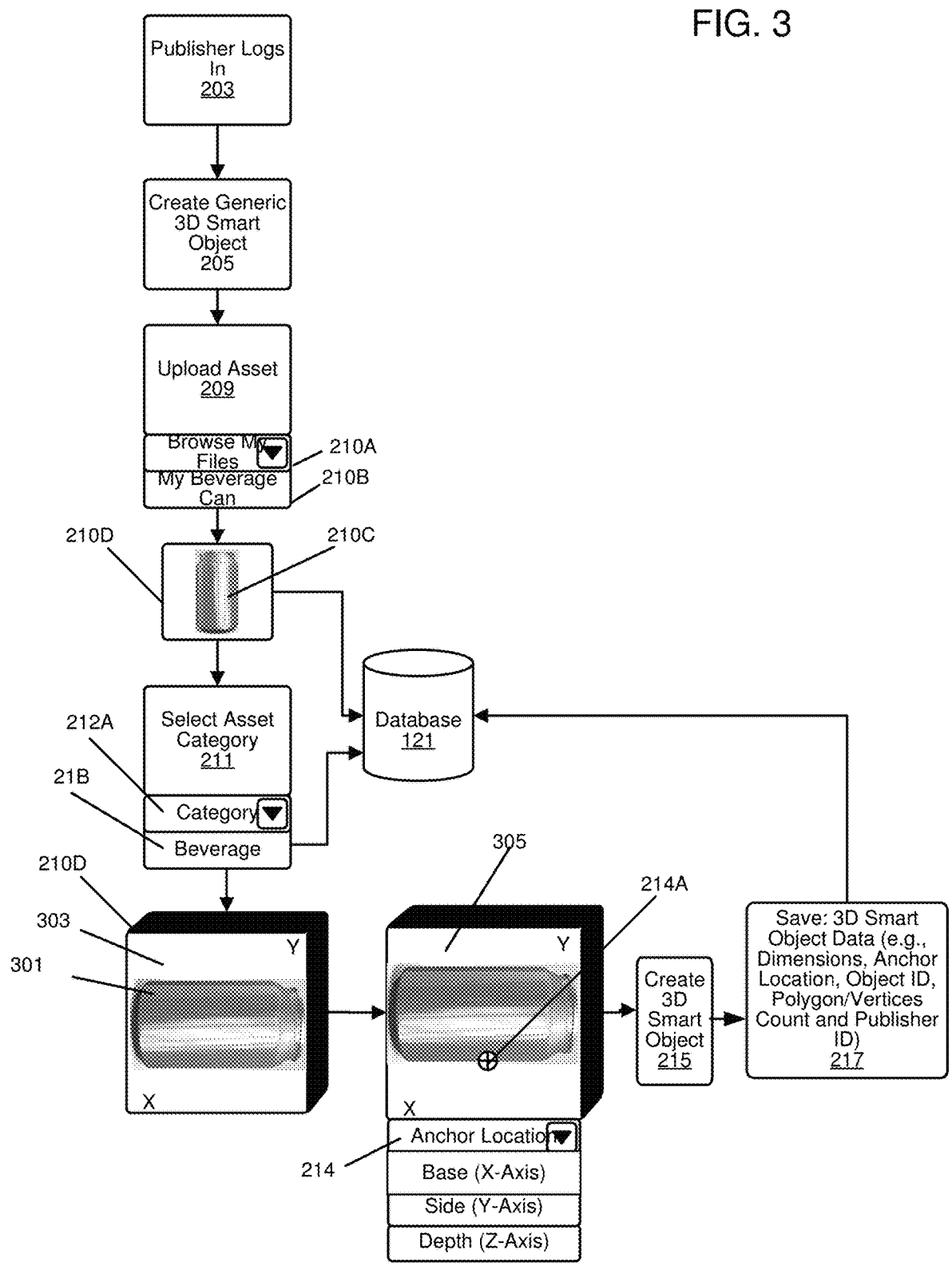
FIG. 3 illustrates a block diagram of the generation of a 3D digital smart object while providing a horizontal orientation, according to one embodiment of the present invention.

FIG. 3 illustrates a block diagram of the generation of a 3D digital smart object while providing a horizontal orientation, according to one embodiment of the present invention. As illustrated in FIG. 2, in one embodiment, at 203, the publisher logs in to generate 3D digital smart object 101 for use in a 3D environment. At 205, the publisher selects to create 3D digital smart object 101. At 209, the publisher uploads an asset to use as a 3D geometrical representation of 3D digital smart object 101. For example, in one embodiment, the user can browse files 210A, and then select an asset 210B (e.g., beverage can), as the intended representation object of 3D digital smart object 101. In one embodiment, once digital smart object generation system 106 receives asset 210C from the publisher, asset 210C is previewed inside a 3D placeholder 210D to the publisher. At 211, the developer is given the opportunity to provide an asset category and/or type that would be associated with the uploaded asset. The asset category and/or type can also be used for cataloging 3D digital smart object 101. For example, in one embodiment, at 212A, the publisher can select asset data, including an asset type category as 'beverage' and at 212B the asset type, in this embodiment, can be a 'beverage can'. At 303, the publisher can change the orientation of asset 210C, as represented by horizontally oriented asset 301. At 305, the publisher can determine the asset anchor position location, and the system can thereby save digital smart object data as described above while discussing FIG. 2.

Figure 4:
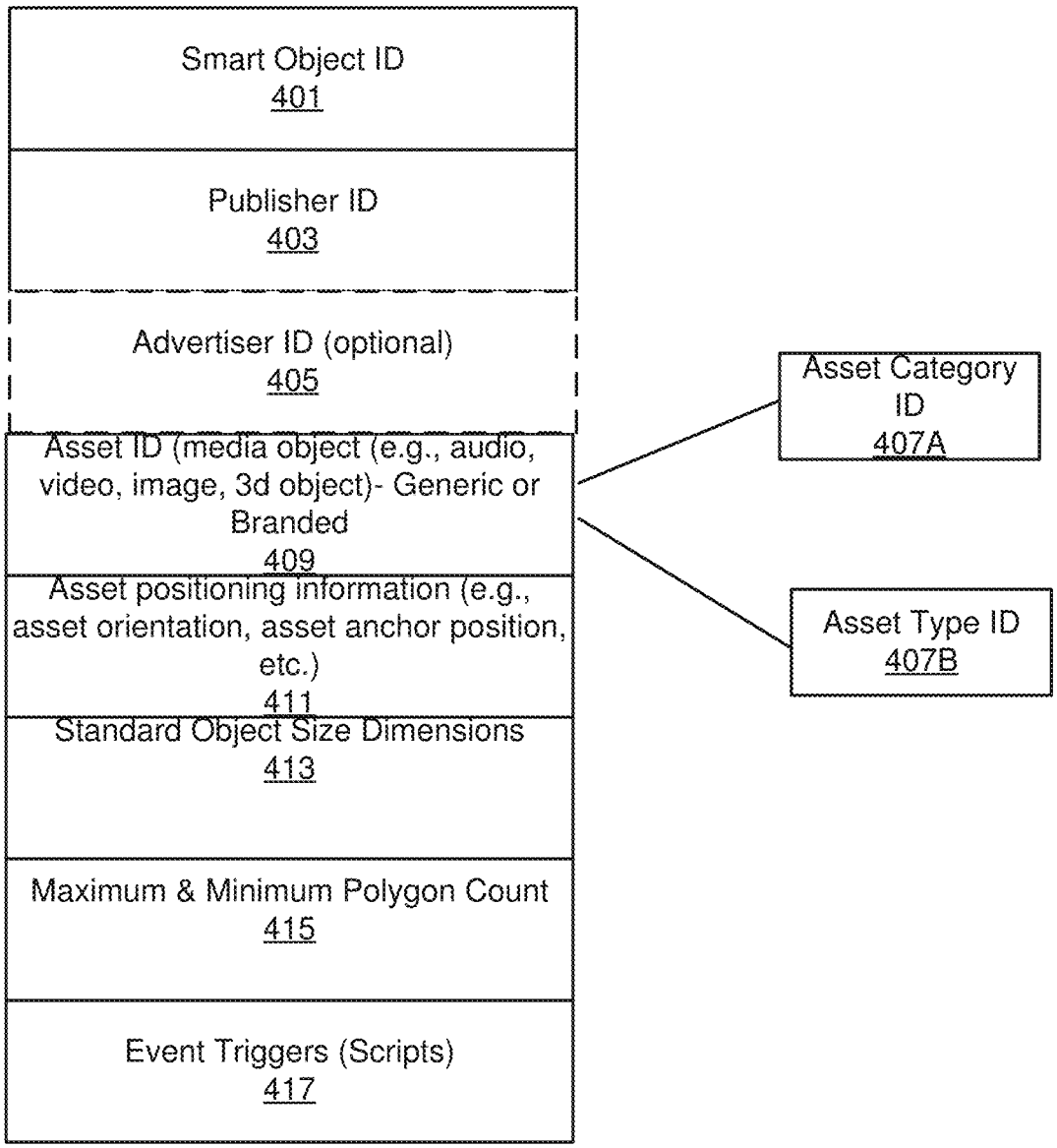
FIG. 4 illustrates a block diagram of the data associated with a 3D digital smart object, according to one embodiment of the present invention.

FIG. 4 illustrates a block diagram of the data associated with a 3D digital smart object, according to one embodiment of the present invention. As illustrated 3D digital smart object 101, in one embodiment, can be associated with digital smart object identification data 401, which represents the identification of the 3D digital smart object when implemented by the publisher and can be associated with digital smart object data stored in repository 121. 3D digital smart object 101 can also be associated with publisher identification data 403 identifying the publisher who implemented the 3D digital smart object. Such identification can be helpful to assist in presenting a game developer digital smart objects only related to their associated 3D digital smart objects, since 3D digital smart objects can be configured, in one embodiment, to collect viewability metrics and transmit it back to the publisher implementing the 3D digital smart object in their 3D environment. In an alternative embodiment, 3D digital smart object 101 can also be associated with advertiser identification 405 which can be used when a GSO asset is replaced with a branded asset to generate a BSO. By associating 3D digital smart object 101 with advertiser identification 405, advertising based metrics can be transmitted to the advertiser. Although the techniques described herein are generally associated with data collection for advertisers, it should be noted, the invention generally relates to data collection using 3D digital smart objects, and is not intended to be limited for advertising purposes. Specifically, the generation of 3D digital smart objects can be used for data collection purposes, in a three dimensional environment, for advertisers, data analysts, software developers (e.g., object performances in game or application development, etc.), or for training purposes in a variety of fields (e.g., medical, military, or any area that involves precision based training using a 3D environment). The data collected by the digital smart objects can then be used for data analysis to determine if a goal has been achieved. In yet another embodiment, the data analysis can be used for predictive advertisement. The goal can be different based on the field where the 3D digital smart objects are used. For example, in the advertising realm, the goal can include user interaction and/or viewability with the 3D digital smart object, in medicinal or military training related tasks the goal can include determining the precise interaction (e.g., orientation, speed, etc.) the 3D digital smart object with the user, etc. In the realm of virtual reality, for example, a user's interaction with the 3D digital smart object can be measured with use of accelerometers, gyroscopes, scripts, or a combination thereof. Therefore, advertiser identification 405 can be associated with any 3rd party (who is not the publisher/developer) of the 3D digital smart object, but as a requirement to collect data from the end user's viewability or interaction with the digital smart object. For example, advertising identification data 405 can be associated with a medical training services provider, military training service provider, etc. depending on the usage of the 3D digital smart object. In one embodiment, data received from the 3D digital smart object can inform the user of their performance score/level.

3D digital smart object 101 can also be associated with asset identification 409 which determines the asset representation(s) (e.g. video, image, 3D object, audio, or a combination thereof) of the 3D digital smart object. In one embodiment, asset identification 409 can also identify if 3D digital smart object 101 is a GSO or BSO, that is, if the asset object/video/3D representation comprises a generic asset or a branded asset. Asset identification 409 can be further associated with asset category identification 407A and/or asset type identification 407B. In one embodiment, the publisher, while generating 3D digital smart object 101, is given a list of predetermined asset categories and/or asset types from which the publisher selects a desired category or type to be associated with 3D digital smart object 101. Assigning an asset category and/or type can be useful while generating a BSO (from a GSO) because it can provide the advertiser with the publisher's intended representation of 3D digital smart object 101. For example, if the publisher generates a GSO and assigns it to category 'beverage', and type 'soda can', this would suggest that a GUCCI® 'leather studded sandal' is not intended to be the branded asset of the GSO. Therefore, in one embodiment, providing an asset category and/or type can prevent ineffective advertising by informing the advertiser of the intended representation of 3D digital smart object 101. Further, asset category and type can also provide the advertiser information about the intended audience of 3D digital smart object 101, since a 'soda can' based branded 3D digital smart object is more likely going to be considered appropriate to a general audience, while a leather studded sandal based branded 3D digital smart object is more likely to be considered suitable to a feminine audience between the ages of 25-50. Thus, by providing an asset category and/or asset type, the publisher can further identify one or more categories/types of different branded objects that are intended to replace the asset in a GSO.

As illustrated in FIG. 4, 3D digital smart object 101 can also be associated with asset positioning information (e.g., asset orientation, asset anchor position, etc.) 411 and standard object size dimensions 413, as disclosed above, herein.

Further, 3D digital smart object 101 can also be associated with a maximum and/or minimum polygon count value 415. In one embodiment, when a publisher is in the process of generating 3D digital smart object 101, the publisher/developer can specify a minimum and/or maximum polygon count value 415 of the 3D asset that would be included in 3D digital smart object 101.). In this embodiment, an advertiser can replace the asset of a GSO with a branded object, where the branded object is related to a brand associated with the advertiser. In this embodiment, once the publisher defines a minimum and maximum polygon count value for the asset associated with the 3D digital smart object (GSO), and a branded object/asset can replace the publisher provided asset only when the branded object has a polygon count within the defined minimum and maximum polygon count value. This can be helpful, among other things, to ensure fast loading 3D digital smart object 101 when it is implemented in a 3D environment. As the polygon count value of a 3D asset can be directly associated with the size of the asset (in memory), setting a minimum and/or maximum polygon can assist in fast loading (or rendering) of 3D digital smart object 101 during implementation. Further, setting minimum/maximum polygon count value 415 can assist the publisher in ensuring the aesthetic aspect of the 3D digital smart object is not compromised when an asset is replaced (e.g., when a GSO asset is replaced with a branded asset to convert the GSO into a BSO.

Further, 3D digital smart object 101 can also be associated with event triggers (e.g. scripts) 417. In one embodiment, the event triggers are capable of determining user interaction with, or viewability of, the 3D digital smart object. Event scripts 117, in one embodiment, can transmit data to the system that can be used to generate user viewability or interaction based metrics. In another embodiment, the event triggers transmit user interaction including determining a user looking at the 3D digital smart object, the user interacting with the 3D digital smart object, a distance between the user and the 3D digital smart object, a percentage size of the 3D digital smart object in relationship to the size of the user interface, a time/period that the user interacted with the 3D digital smart object, the percentage of the smart object seen from the user, the angle with which the 3D digital smart object was moved or lifted by the user, or the speed with which the 3D digital smart object was moved by the user, etc. Non-limiting examples of event triggers can include the events as illustrated below in table 1:

TABLE 1

| Event Trigger | Purpose |
| --- | --- |
| OnClicked( ); | Triggers whenever the digital smart object is tapped or clicked |
| GetScreenRealEstate( ); | Gets screen real estate at current time and stores in array for calculating averages of the time the user could view the 3D digital smart object |
| IsInView( ); | Various calculations to determine whether object is in view using ray casts to main camera (user focus). If actual geometry determination is not performed, this can, in one embodiment, be determined by collision detection so determination can be based on probability. |
| OpenDetails( ); | Provide details of the information associated with the digital smart object (e.g., in a pop-up window). |

TABLE 1-continued

| Event Trigger | Purpose |
| --- | --- |
| ObjectAngle( ); | Relative angle with which the user is interacting with the digital smart object |
| UserSpeed( ); | The relative speed (pixel traversed per seconds) with which a user is moving the digital smart object |

In one embodiment, digital smart objects can also include a collision mesh (e.g., in gaming environments), which can be used to detect event triggers. Thus, digital smart objects, in one embodiment, can be used to calculate if an object is visible to a user, and if so, the percentage of the smart object viewable on the user's screen. For example, digital smart objects implemented in a gaming environment (where a collision mesh can be implemented), can determine if a mesh renderer is active, and further evaluate if a digital smart object is being drawn on the current Camera's culling mask. Thereafter, using ray casting techniques, a line between the main camera and the digital smart object can be drawn. If this line collides with a collidable mesh of the digital smart object then it can be assumed that the digital smart object is being blocked (and is viewable on the user's interface). To calculate the proportion of the digital smart object on screen, in a gaming environment, a screen bounds function (or equivalent) can be used to obtain an approximation (percentage) of the screen that the digital smart object is covering. In other environments (e.g., non-gaming environments) similar techniques can be implemented, as known to a person having ordinary skill in the art.

A person having ordinary skill in the art would appreciate that other event triggers can also be implemented, depending on the business needs of the advertiser/service provider, and/or publisher. Thus, in another embodiment, other functions specific to individual digital smart objects can also be specified (e.g., other multimedia effects within the 3D digital environment can be affected). In one embodiment, 3D digital smart object 101 can be configured to transmit the data generated by the event triggers to a digital smart object manager which can forward the information to one or more systems for metrics generation and/or further processing. In one embodiment, event triggers can be configured or customized by the publisher or advertiser/service provider, depending on their business needs. In yet another embodiment, event triggers cannot be configured or customized by the publisher or advertiser/service provider, in order to prevent advertisement metrics, viewability/interaction fraud with the 3D digital smart object. In such an embodiment, event trigger scripts can be encrypted and provided by 3D digital smart object generator 106. In this embodiment, a developer and/or advertiser can present a request to the system to generate event trigger scripts that can be customized by the developer/publisher, or can request the system to create entirely new event trigger scripts to meet specific data reporting needs of the publisher.

Figure 5:
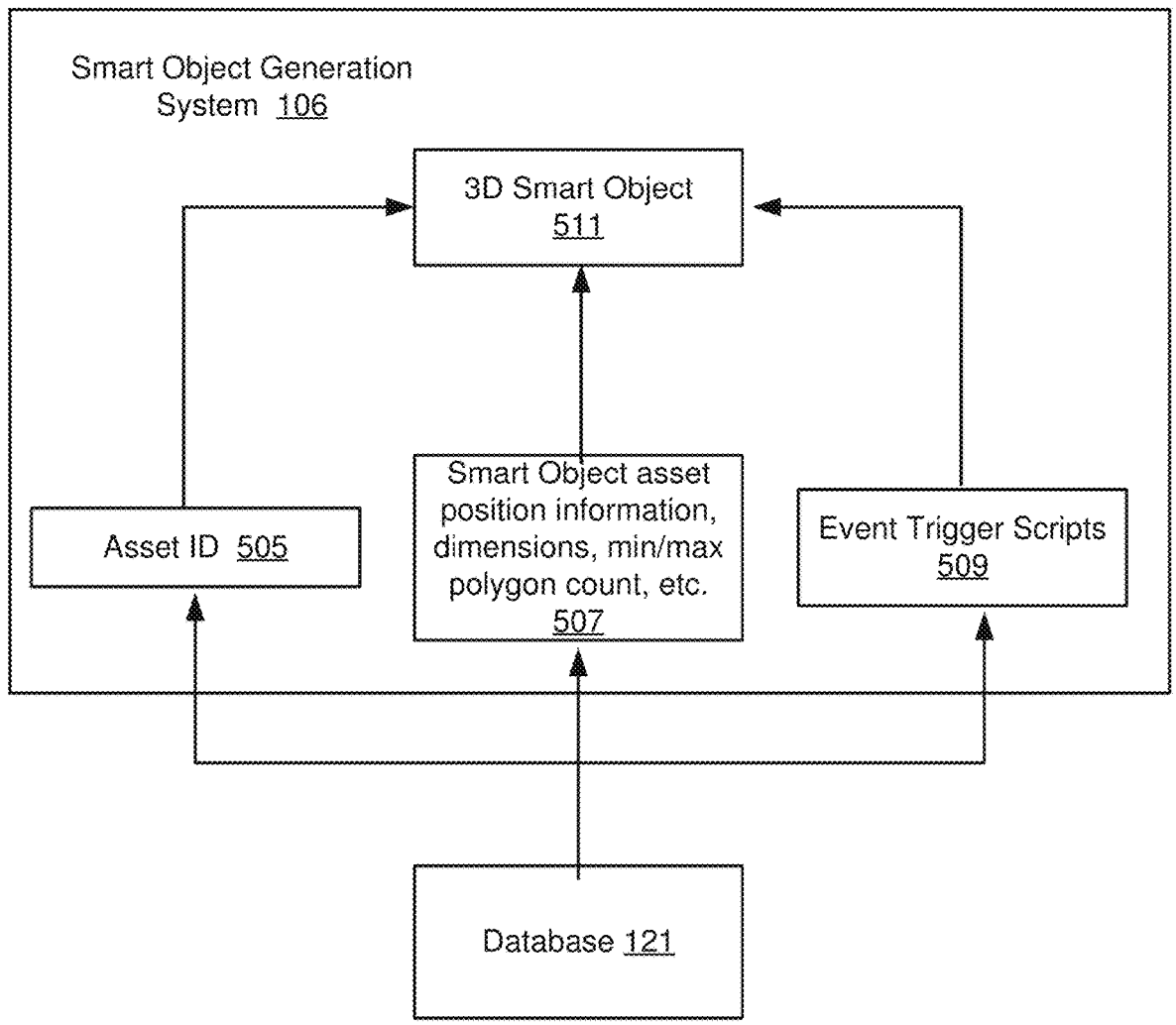
FIG. 5 illustrates a block diagram of a system that generates 3D digital smart objects, according to an embodiment of the present invention.

FIG. 5 illustrates a block diagram of a system that generates 3D digital smart objects, according to an embodiment of the present invention. In one embodiment, based on any digital smart object ID, Digital smart object generation system 106 can retrieve digital smart object data (from database 121), including asset information related to the 3D digital smart object from an associated asset ID 505, digital smart object position information, dimensions, min/max polygon count value, etc. 507, and associated event trigger scripts 509. After gathering the digital smart object data, digital smart object generation system can generate (as disclosed herein) a 3D digital smart object to be implemented in various 3D environments.

Figure 6:
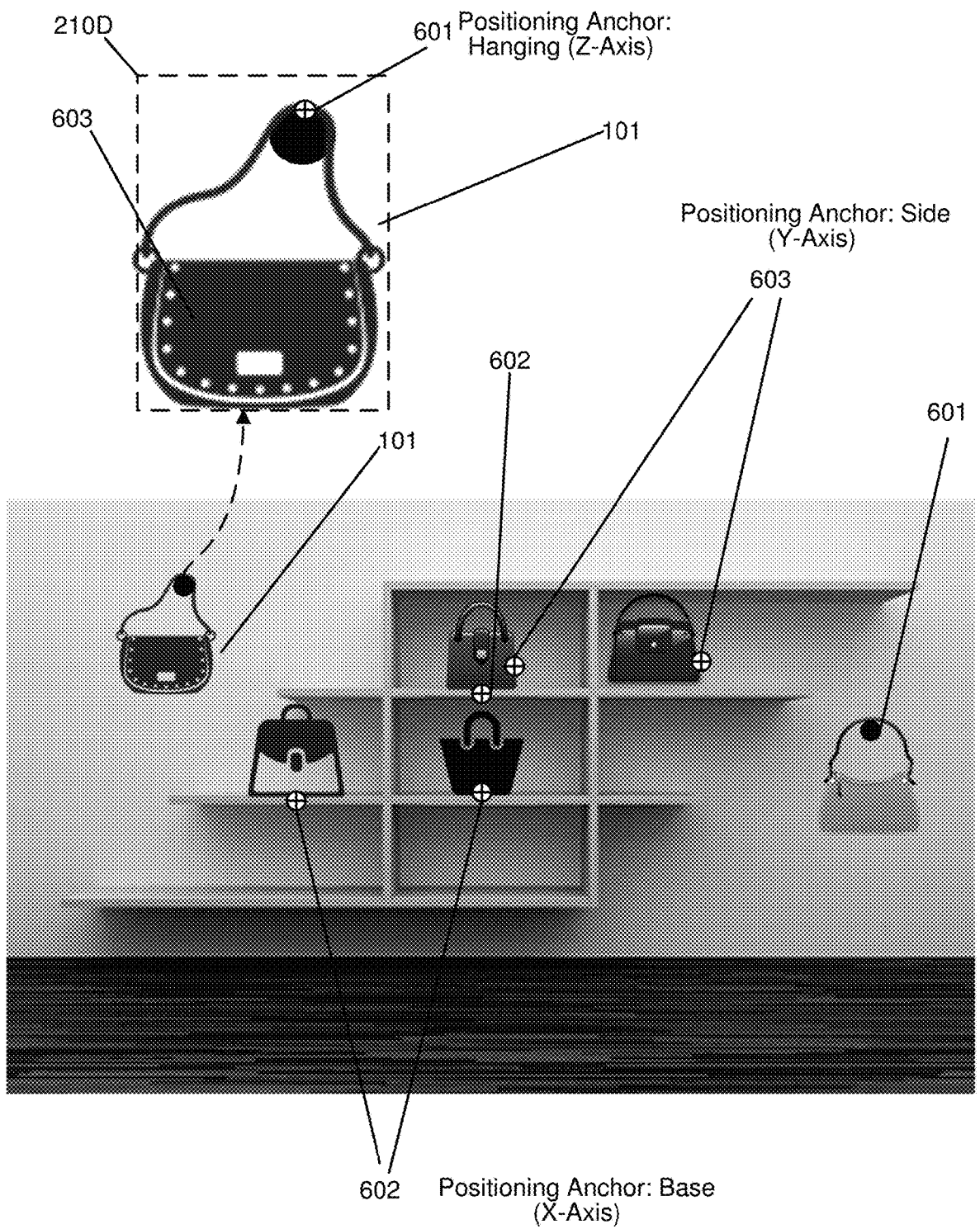
FIG. 6 illustrates the asset positioning anchor of 3D digital smart objects, according to one embodiment of the present invention.

FIG. 6 illustrates the asset positioning anchor of 3D digital smart objects, according to one embodiment of the present invention. As illustrated, various 3D digital smart objects 101 implemented in a 3D environment are displayed. In one embodiment, 3D digital smart object 101 can, once implemented in the 3D environment, display asset 603 with its positioning based on the defined asset position anchor 214. Position anchor, as illustrated, can be in a hanging position 601 relative to 3D placeholder 210D, anchored to the base 602 of 3D placeholder 210D, anchored to the side 603 or placeholder 210D, or a combination thereof.

Figure 7:
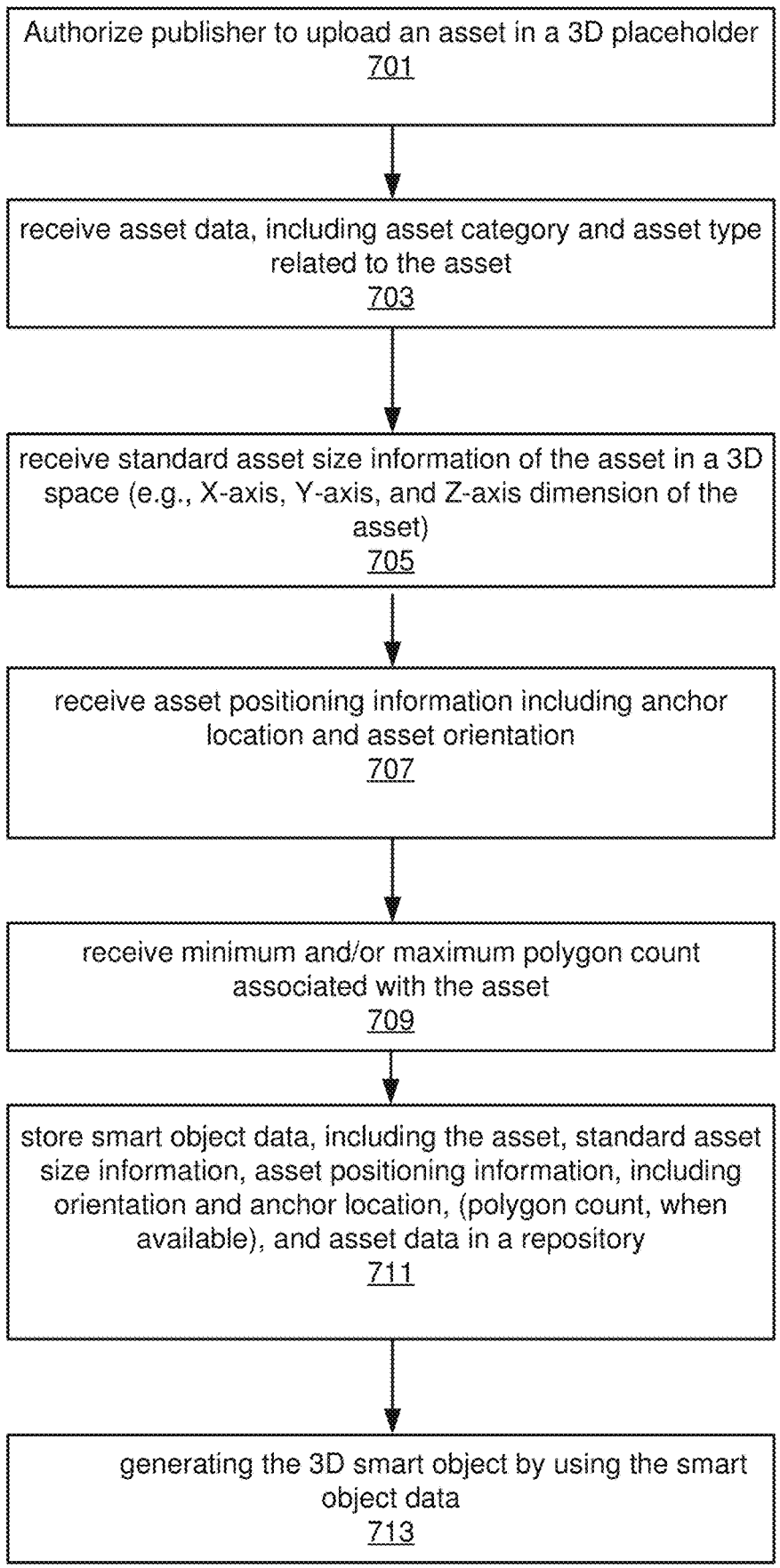
FIG. 7 illustrates a flow chart of a method by a system to generate a 3D digital smart object, according to one embodiment of the present invention.

FIG. 7 illustrates a flow chart of a method by a system to generate a 3D digital smart object, according to one embodiment of the present invention. As illustrated, at 701, a system implementing the method includes authorizing a publisher to upload an asset in a 3D placeholder. At 703, the system receives asset data, including asset category and asset type related to the asset. At 705, the system can further be configured to receive standard asset size information of the asset in a 3D space (e.g., X-axis, Y-axis, and Z-axis dimension of the asset). At 707, the system receives asset positioning information including anchor location and asset orientation. Thereafter, the system, at 709, receives minimum and/or maximum polygon count value associated with the asset, and stores the digital smart object data received, including the asset, standard asset size information, asset positioning information (anchor location and/or orientation), polygon count value (when available), and asset data into the repository. At 713, the system can generate the 3D digital smart object by using the digital smart object data received from the publisher.

Figure 8:
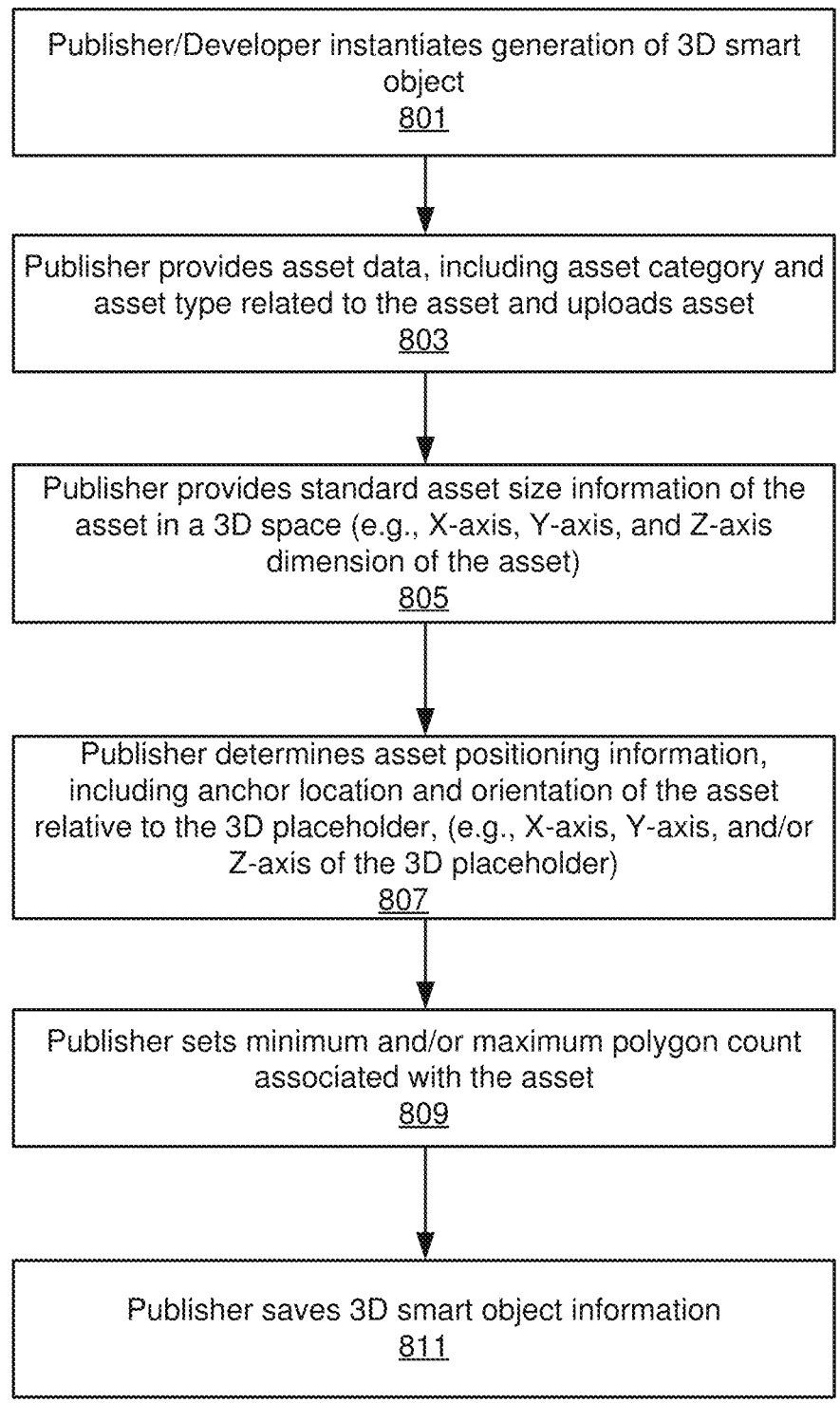
FIG. 8 illustrates a flow chart of a method implemented by a client machine to generate a 3D digital smart object, according to one embodiment of the present invention.

FIG. 8 illustrates a flow chart of a method implemented by a client machine to generate a 3D digital smart object, according to one embodiment of the present invention. As illustrated, a publisher/developer instantiates the generation of 3D digital smart object, at 801. At 803, the publisher provides asset data, including asset category and asset type related to the asset and uploads the asset. The publisher then provides, at 805, standard asset size information of the asset in a 3D space (e.g., X-axis, Y-axis, and Z-axis dimension of the asset). At 807, the publisher determines asset positioning information, including anchor location and orientation of the asset relative to the 3D placeholder, (e.g., X-axis coordinates, Y-axis coordinates, Z-axis coordinates, or a combination thereof of the 3D placeholder). The publisher can also set the minimum and/or maximum polygon count value associated with the asset, at 809, and then at 811, save 3D digital smart object information.

Figure 9:
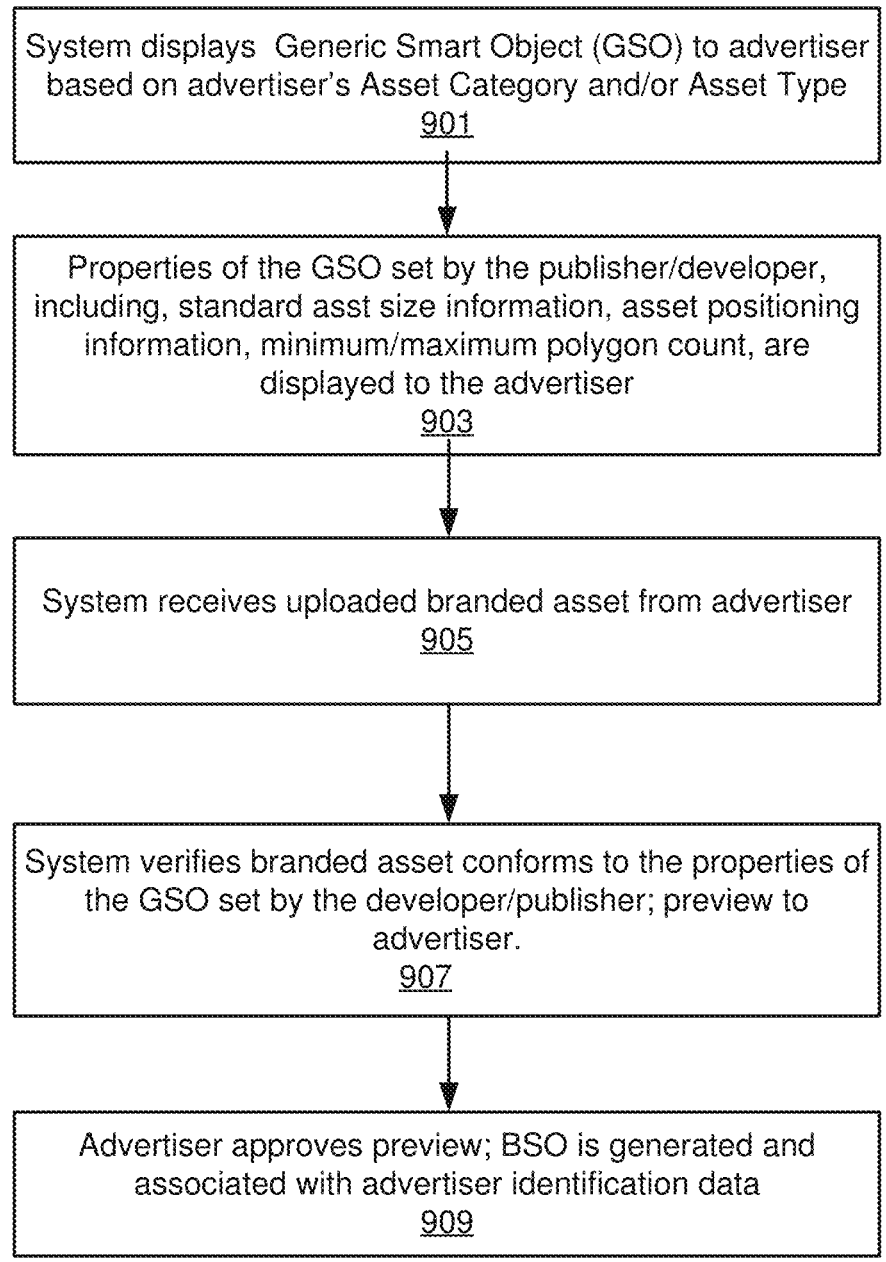
FIG. 9 illustrates a flow chart of generating a branded digital smart object from a generic digital smart object by a system, according to one embodiment of the present invention.

FIG. 9 illustrates a flow chart of generating a branded digital smart object from a generic digital smart object by a system, according to one embodiment of the present invention.

As illustrated, the system, after an advertiser logs into the digital smart object generation system, in one embodiment, the system displays available Generic Digital smart objects (GSOs) to an advertiser based on advertiser's selected Asset Category and/or Asset Type, at 901. At 903, the properties of a GSO set by the publisher/developer, including standard asset size information, asset positioning information, and/or minimum/maximum polygon count value, are displayed to the advertiser. At 905, the system receives an uploaded branded asset from advertiser. At 907, the system verifies that the uploaded branded asset conforms to the properties of the GSO as set by the developer/publisher. At 909, the BSO is previewed to the advertiser and the BSO is associated with advertiser identification; the system then saves the associated data to the repository. Thereafter, once the GSO is implemented by a developer/publisher in a 3D environment, the BSO can be displayed instead of the GSO and transmit necessary data to a system capable of receiving the information (e.g., digital smart object processing system 110) to generate and process necessary metrics for the advertiser.

The techniques shown in the figures can be implemented using computer program instructions (computer code) and data stored and executed on one or more electronic systems (e.g., computer systems, etc.). Such electronic systems store and communicate (internally and/or with other electronic systems over a network) code and data using machine-readable media, such as machine-readable non-transitory storage media (e.g., magnetic disks; optical disks; random access memory; dynamic random access memory; read only memory; flash memory devices; phase-change memory). In addition, such electronic systems typically include a set of one or more processors coupled to one or more other components, such as one or more storage devices, user input/output devices (e.g., a keyboard, a touchscreen, and/or a display), and network connections. The coupling of the set of processors and other components is typically through one or more busses and bridges (also termed as bus controllers). The storage device and signals carrying the network traffic respectively represent one or more machine-readable storage media and machine-readable communication media. Thus, the storage device of a given electronic device typically stores code and/or data for execution on the set of one or more processors of that electronic device.

It should be apparent from this description that aspects of the present invention may be embodied, at least in part, in software. That is, the techniques may be carried out in a computer system or other computer system in response to its processor, such as a microprocessor, executing sequences of instructions contained in memory, such as a ROM, DRAM, mass storage, or a remote storage device. In various embodiments, hardware circuitry may be used in combination with software instructions to implement the present invention. Thus, the techniques are not limited to any specific combination of hardware circuitry and software nor to any particular source for the instructions executed by the computer system. In addition, throughout this description, various functions and operations are described as being performed by or caused by software code to simplify the description. However, those skilled in the art will recognize what is meant by such expressions is that the functions result from execution of the code by a processor.

Figure 10:
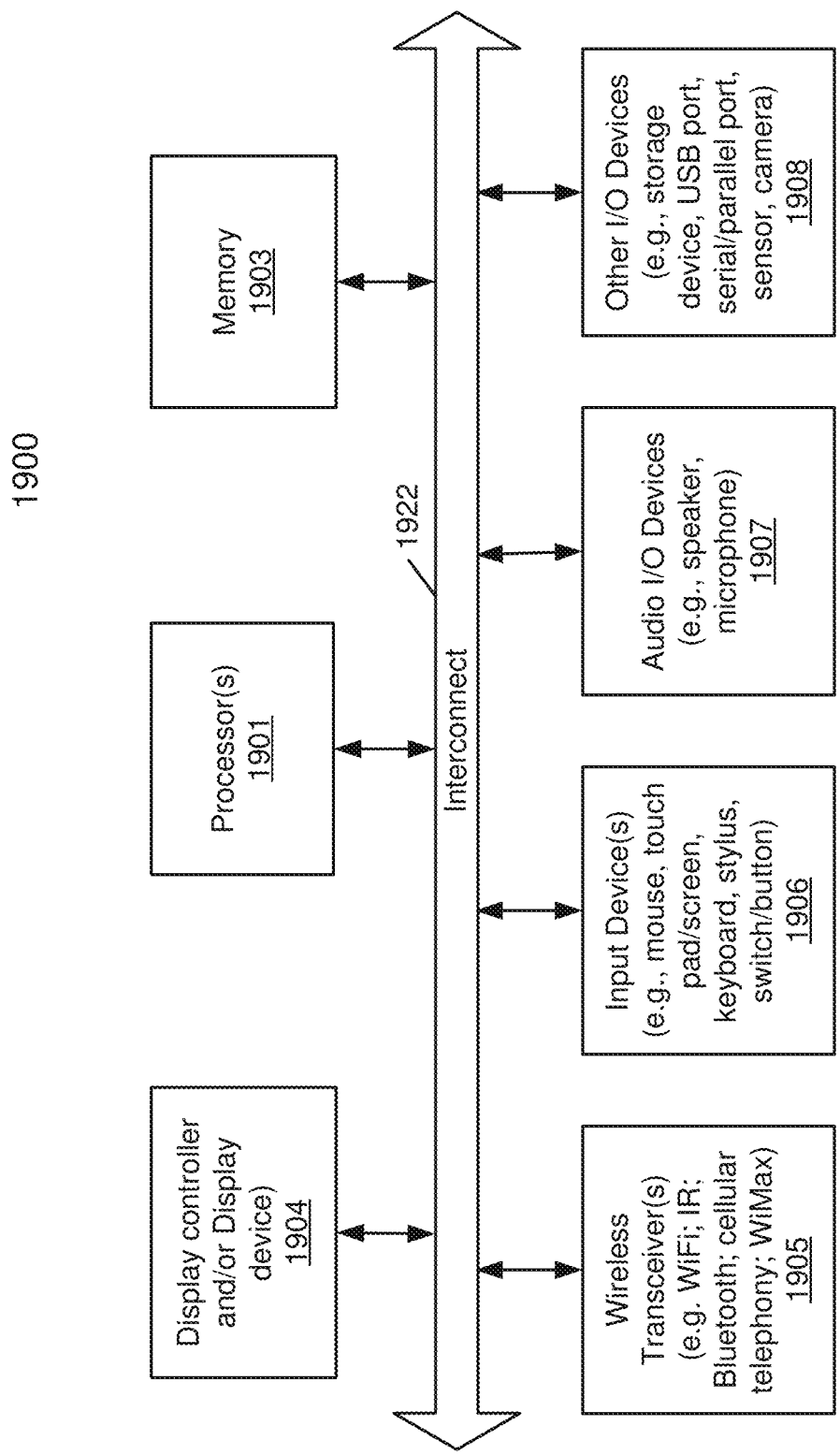
FIG. 10 is a block diagram illustrating a data processing system such as a computing system which can be used with an embodiment of the present invention.

FIG. 10 is a block diagram illustrating a data processing system such as a computing system 1900 which may be used with one embodiment of the invention. For example, system 1900 may be implemented as part of a system that can at least generate 3D digital smart objects using the techniques described herein. In one embodiment, system 1900 may represent digital smart object generating system 106, digital smart object placement system 108, or digital smart object processing system 110. System 1900 may have a distributed architecture having dispersed units coupled through a network, or all of its components may be integrated into a single unit. Computing system 1900 may be implemented as part of a diverse range of products implemented by Trivver, Inc.

For example, computing system 1900 may represent any data processing systems described above performing any of the processes or methods described above. System 1900 can include many different components. These components can be implemented as integrated circuits (ICs), portions thereof, discrete electronic devices, or other modules adapted to a circuit board such as a motherboard or add-in card of the computer system, or as components otherwise incorporated within a chassis of the computer system. Note also that system 1900 is intended to show a high level view of many components of the computer system. However, it is to be understood that additional or fewer components may be present in certain implementations and furthermore, different arrangement of the components shown may occur in other implementations. System 1900 may represent a desktop, a laptop, a tablet, a server, a mobile phone, a programmable logic controller, a personal digital assistant (PDA), a personal communicator, a network router or hub, a wireless access point (AP) or repeater, a set-top box, or a combination thereof.

In one embodiment, system 1900 includes processor 1901, memory 1903, and devices 1905-1908 via a bus or an interconnect 1922. Processor 1901 may represent a single processor or multiple processors with a single processor core or multiple processor cores included therein. Processor 1901 may represent one or more general-purpose processors such as a microprocessor, a central processing unit (CPU), or the like. More particularly, processor 1901 may be a complex instruction set computing (CISC) microprocessor, reduced instruction set computing (RISC) microprocessor, very long instruction word (VLIW) microprocessor, or processor implementing other instruction sets, or processors implementing a combination of instruction sets. Processor 1901 may also be one or more special-purpose processors such as an application specific integrated circuit (ASIC), a cellular or baseband processor, a field programmable gate array (FPGA), a digital signal processor (DSP), a network processor, a graphics processor, a network processor, a communications processor, a cryptographic processor, a co-processor, an embedded processor, or any other type of logic capable of processing instructions.

Processor 1901, which may be a low power multi-core processor socket such as an ultra-low voltage processor, may act as a main processing unit and central hub for communication with the various components of the system. Such processor can be implemented as a system on chip (SoC). In one embodiment, processor 1901 may be an Intel® Architecture Core™-based processor such as an i3, i5, i19 or another such processor available from Intel Corporation, Santa Clara, Calif. However, other low power processors such as available from Advanced Micro Devices, Inc. (AMD) of Sunnyvale, Calif., an ARM-based design from ARM Holdings, Ltd. or a MIPS-based design from MIPS Technologies, Inc. of Sunnyvale, Calif., or their licensees or adopters may instead be present in other embodiments.

Processor 1901 is configured to execute instructions for performing the operations and methods discussed herein. System 1900 further includes a graphics interface that communicates with graphics subsystem 1904, which may include a display controller and/or a display device.

Processor 1901 may communicate with memory 1903, which in an embodiment can be implemented via multiple memory devices to provide for a given amount of system memory. As examples, the memory can be in accordance with a Joint Electron Devices Engineering Council (JEDEC) low power double data rate (LPDDR)-based design such as the current LPDDR2 standard according to JEDEC JESD 207-2E (published April 2007), or a next generation LPDDR standard to be referred to as LPDDR3 that will offer extensions to LPDDR2 to increase bandwidth. As examples, 2/4/8 gigabytes (GB) of system memory may be present and can be coupled to processor 1901 via one or more memory interconnects. In various implementations the individual memory devices can be of different package types such as single die package (SDP), dual die package (DDP) or quad die package (QDP). These devices can in some embodiments be directly soldered onto a motherboard to provide a lower profile solution, while in other embodiments the devices can be configured as one or more memory modules that in turn can couple to the motherboard by a given connector.

Memory 1903 can be a machine readable non-transitory storage medium such as one or more volatile storage (or memory) devices such as random access memory (RAM), dynamic RAM (DRAM), synchronous DRAM (SDRAM), static RAM (SRAM), or other types of storage devices such as hard drives and flash memory. Memory 1903 may store information including sequences of executable program instructions that are executed by processor 1901, or any other device. For example, executable code and/or data of a variety of operating systems, device drivers, firmware (e.g., input output basic system or BIOS), and/or applications can be loaded in memory 1903 and executed by processor 1901. An operating system can be any kind of operating systems, such as, for example, Windows® operating system from Microsoft®, Mac OS®/iOS® from Apple, Android® from Google®, Linux®, Unix®, or other real-time or embedded operating systems such as VxWorks.

System 1900 may further include IO devices such as devices 1905-1908, including wireless transceiver(s) 1905, input device(s) 1906, audio IO device(s) 19019, and other IO devices 1908. Wireless transceiver 1905 may be a WiFi transceiver, an infrared transceiver, a Bluetooth transceiver, a WiMax transceiver, a wireless cellular telephony transceiver, a satellite transceiver (e.g., a global positioning system (GPS) transceiver), or other radio frequency (RF) transceivers, network interfaces (e.g., Ethernet interfaces) or a combination thereof.

Input device(s) 1906 may include a mouse, a touch pad, a touch sensitive screen (which may be integrated with display device 1904), a pointer device such as a stylus, and/or a keyboard (e.g., physical keyboard or a virtual keyboard displayed as part of a touch sensitive screen). For example, input device 1906 may include a touch screen controller coupled to a touch screen. The touch screen and touch screen controller can, for example, detect contact and movement or break thereof using any of a plurality of touch sensitivity technologies, including but not limited to capacitive, resistive, infrared, and surface acoustic wave technologies, as well as other proximity sensor arrays or other elements for determining one or more points of contact with the touch screen.

Audio IO device 1907 may include a speaker and/or a microphone to facilitate voice-enabled functions, such as voice recognition, voice replication, digital recording, and/or telephony functions. Other optional devices 1908 may include a storage device (e.g., a hard drive, a flash memory device), universal serial bus (USB) port(s), parallel port(s), serial port(s), a printer, a network interface, a bus bridge (e.g., a PCI-PCI bridge), sensor(s) (e.g., a motion sensor such as an accelerometer, gyroscope, a magnetometer, a light sensor, compass, a proximity sensor, etc.), or a combination thereof. Optional devices 1908 may further include an imaging processing subsystem (e.g., a camera), which may include an optical sensor, such as a charged coupled device (CCD) or a complementary metal-oxide semiconductor (CMOS) optical sensor, utilized to facilitate camera functions, such as recording photographs and video clips. Certain sensors may be coupled to interconnect 1907 via a sensor hub (not shown), while other devices such as a keyboard or thermal sensor may be controlled by an embedded controller (not shown), dependent upon the specific configuration or design of system 1900.

To provide for persistent storage of information such as data, applications, one or more operating systems and so forth, a mass storage (not shown) may also couple to processor 1901. In various embodiments, to enable a thinner and lighter system design as well as to improve system responsiveness, this mass storage may be implemented via a solid state device (SSD). However in other embodiments, the mass storage may primarily be implemented using a hard disk drive (HDD) with a smaller amount of SSD storage to act as a SSD cache to enable non-volatile storage of context state and other such information during power down events so that a fast power up can occur on RE-initiation of system activities. Also a flash device may be coupled to processor 1901, e.g., via a serial peripheral interface (SPI). This flash device may provide for non-volatile storage of system software, including a basic input/output software (BIOS) as well as other firmware of the system.

Note that while system 1900 is illustrated with various components of a data processing system, it is not intended to represent any particular architecture or manner of interconnecting the components; as such details are not germane to embodiments of the present invention. It will also be appreciated that network computers, handheld computers, mobile phones, and other data processing systems which have fewer components or perhaps more components may also be used with embodiments of the invention.

Thus, methods, apparatuses, and computer readable medium to generate 3D digital smart objects for implementation (or use) in a 3D environment. Although the present invention has been described with reference to specific exemplary embodiments, it will be evident that various modifications and changes may be made to these embodiments without departing from the broader spirit and scope of the invention as set forth in the claims. Accordingly, the specification and drawings are to be regarded in an illustrative rather than a restrictive sense.

The invention claimed is:

1. A method, comprising:
   receiving, by a development platform of a three dimensional (3D) environment, a 3D placeholder, wherein the development platform is configured to receive the 3D placeholder via at least one of an Application Programing Interface (API) or a Software Development Kit (SDK);
   receiving, by the development platform, an asset, into the 3D placeholder, wherein the asset is associated with a minimum and maximum polygon count value, and wherein the asset is configured to be replaced with another asset having a polygon count value between the minimum and maximum polygon count value;
   wherein the method generates a 3D digital object in the development platform of the 3D environment, and wherein the 3D environment is generated by one or more computing devices.

2. The method of claim 1, wherein at least one event trigger can be associated with the 3D digital object.

3. The method of claim 2, wherein the at least one event trigger transmits data related to determining at least one of a user viewing the asset, the user interacting with the asset, a distance between the user and the asset, a percentage size of the asset in relationship to a size of the graphical user interface, a percentage of the asset that was viewed on the graphical user interface, or a period of time that the user interacted with the asset.

4. The method of claim 2, wherein the at least one event trigger transmits data related to user movement and orientation of the 3D digital object.

5. The method of claim 1, wherein the asset is a generic 3D representation of geometric data, wherein the asset within the 3D placeholder provides a visual representation of the 3D digital object.

6. The method of claim 1, wherein the asset can be replaced with a branded object.

7. The method of claim 6, wherein different branded objects can replace the asset based on an asset category and asset type associated with the asset.

8. The method of claim 1, wherein a standard asset size information is received by the development platform, the standard asset size information providing a maximum 3D size of the asset relative to the 3D placeholder, and wherein the standard asset size information is determined when at least one of the X-axis, Y-axis, or Z-axis dimension of the asset equals to its corresponding axis dimension of the 3D placeholder.

9. The method of claim 1, wherein the asset is associated with an anchor location.

10. A non-transitory computer readable medium comprising instructions which when executed by a processing device, comprising at least one processing core, executes a method, comprising:
receiving a three dimensional (3D) placeholder in a development platform of a first 3D environment, the development platform configured to receive the 3D placeholder via at least one of an Application Programming Interface (API) or a Software Development Kit (SDK);
receiving an asset into the 3D placeholder, wherein the asset is associated with a minimum and maximum polygon count value, and wherein the asset is configured to be replaced with another asset having a polygon count value between the minimum and maximum polygon count value;
wherein the processing device generates a 3D digital object in the development platform of the 3D environment, and wherein the 3D environment is generated by one or more computing devices.

11. The non-transitory computer readable medium of claim 10, wherein at least one event trigger can be associated with the 3D digital object.

12. The non-transitory computer readable medium of claim 11, wherein the at least one event trigger transmits data related to user movement and orientation of the 3D digital object.

13. The non-transitory computer readable medium of claim 11, wherein the at least one event trigger transmits data related to determining at least one of a user viewing the asset, the user interacting with the asset, a distance between the user and the asset, a percentage size of the asset in relationship to a size of the graphical user interface, a percentage of the asset that was viewed on the graphical user interface, or a period of time that the user interacted with the asset.

14. The non-transitory computer readable medium of claim 10, wherein the asset is a generic 3D representation of geometric data, wherein the asset within the 3D placeholder provides a visual representation of the 3D digital object.

15. The non-transitory computer readable medium of claim 10, wherein the asset can be replaced with a branded object.

16. The non-transitory computer readable medium of claim 15, wherein different branded objects can replace the asset based on an asset category and asset type associated with the asset.

17. The non-transitory computer readable medium of claim 10, wherein a standard asset size information is received by the development platform, the standard asset size information providing a maximum 3D size of the asset relative to the 3D placeholder, and wherein the standard asset size information is determined when at least one of the X-axis, Y-axis, or Z-axis dimension of the asset equals to its corresponding axis dimension of the 3D placeholder.

18. The non-transitory computer readable medium of claim 10, wherein the asset is associated with an anchor location.

19. A system, comprising:
a memory device; and
a processing system comprising at least one hardware processing core, coupled to the memory device, the processing system configured to:
receive a three dimensional (3D) placeholder in a development platform of a first 3D environment, wherein the development platform is configured to receive the 3D placeholder via at least one of an Application Programming Interface (API) or a Software Development Kit (SDK);
receive an asset into the 3D placeholder, wherein the asset is associated with a minimum and maximum polygon count value, and wherein the asset is configured to be replaced with another asset having a polygon count value between the minimum and maximum polygon count value;
wherein the processing system is configured to generate a 3D digital object in the development platform of the 3D environment, and wherein the 3D environment is generated by one or more computing devices.

20. The system of claim 19, wherein at least one event trigger can be associated with the 3D digital object.

21. The system of claim 20, wherein the at least one event trigger transmits data related to user movement and orientation of the 3D digital object.

22. The system of claim 20, wherein the at least one event trigger transmits data related to determining at least one of a user viewing the asset, the user interacting with the asset, a distance between the user and the asset, a percentage size of the asset in relationship to a size of the graphical user interface, a percentage of the asset that was viewed on the graphical user interface, or a period of time that the user interacted with the asset.

23. The system of claim 19, wherein the asset is a generic 3D representation of geometric data, wherein the asset within the 3D placeholder provides a visual representation of the 3D digital object.

24. The system of claim 19, wherein the asset can be replaced with a branded object.

25. The system of claim 24, wherein different branded objects that can replace the asset based on an asset category and asset type associated with the asset.

26. The system of claim 19, wherein a standard asset size information is received by the development platform, the standard asset size information providing a maximum 3D size of the asset relative to the 3D placeholder, and wherein the standard asset size information is determined when at least one of the X-axis, Y-axis, or Z-axis dimension of the asset equals to its corresponding axis dimension of the 3D placeholder.

27. The system of claim 19, wherein the asset is associated with an anchor location.

\* \* \* \* \*